UNITED STATES PATENT OFFICE.

ALFRED HOBBS, OF SYRACUSE, NEW YORK.

WALL-PLASTER.

SPECIFICATION forming part of Letters Patent No. 520,783, dated June 5, 1894.

Application filed September 15, 1893. Serial No. 485,551. (No specimens.)

*To all whom it may concern:*

Be it known that I, ALFRED HOBBS, of Syracuse, in the county of Onondaga, in the State of New York, have invented new and useful Improvements in Wall-Plasters, of which the following, taken in connection with the accompanying drawings, is a full, clear, and exact description.

This invention relates to wall plasters or compositions for architectural purposes as a new article of manufacture; and has for its object the composition of the ingredients hereinafter described to produce a quick setting wall plaster; cheap in its component parts and of great utility. And to that end my invention consists in the composition of the several ingredients hereinafter described and specifically combined in the claim hereto annexed.

To mix a batch of wall plaster containing about eighteen hundred pounds, I use the following ingredients, in substantially the following proportions: plaster of paris, five hundred pounds; sand, twelve hundred and fifty pounds; quick-lime, one hundred and fifty pounds; pyro-borate of sodium, three pounds.

To this mixture may be added hair, jute, or any other fibrous material to impart tenacity to the plaster after it has been put upon the walls.

The above composition is mixed dry and shipped either in boxes or barrels or any other convenient way, and when ready for use sufficient water is added thereto to make the compound plastic and pliable. The pyro-borate of sodium is used for the purpose of retarding the setting of the compound and the composition may be retarded in proportion to the amount of pyro-borate of sodium used.

What I claim as my invention, and desire to secure by Letters Patent, is—

The herein described composition for wall plaster comprising plaster of paris, sand, quick-lime, and pyro-borate of sodium.

In witness whereof I have hereunto set my hand this 6th day of September, 1893.

ALFRED HOBBS.

In presence of—
C. W. SMITH,
HOWARD P. DENISON.